United States Patent [19]

Cox, Jr.

[11] 3,974,010

[45] Aug. 10, 1976

[54] METHOD OF STITCHING AND BONDING EMBROIDERIES ONTO THERMOPLASTIC BACKING SHEETS

[75] Inventor: Thaddeus Hall Cox, Jr., Freeland, Md.

[73] Assignee: Artistic Identification Systems, Inc., Pompton Lakes, N.J.

[22] Filed: May 7, 1975

[21] Appl. No.: 575,332

[52] U.S. Cl. .................................. 156/93; 156/184; 156/238; 156/247; 156/344; 428/42; 428/102; 112/266; 112/439

[51] Int. Cl.² ..................... B32B 7/08; B65H 81/00; D05C 17/00

[58] Field of Search .................. 428/42, 108, 40–41, 428/480; 156/238, 247, 230, 93, 344; 112/266, 439

[56] References Cited

UNITED STATES PATENTS

| | | | |
|---|---|---|---|
| 3,150,216 | 9/1964 | Salcer | 264/161 |
| 3,463,692 | 8/1969 | Brunner | 112/266 X |
| 3,657,060 | 4/1972 | Haigh | 428/480 X |
| 3,662,878 | 5/1972 | Conrad | 206/45.33 |

*Primary Examiner*—Philip Dier
*Attorney, Agent, or Firm*—Lerner, David, Littenberg & Samuel

[57] ABSTRACT

A method of preparing articles of aetzed embroidery is provided which includes stitching embroideries on a backing of thermoplastic material to form composites, with the backing being either a continuous web or individual sheets. The composites are fed into juxtaposition with a transfer strip having a first side thereof to which the thermoplastic backing material will readily adhere. The composites and the transfer strip are pressed together and heat is simultaneously applied to bring the thermoplastic backing material to its fusing temperature so that the portion thereof covered by the embroideries adheres to the embroideries, and the excess portion of the thermoplastic backing material not covered by the embroideries fuses and adheres to the first side of the transfer strip. Thereafter, the transfer strip and the aetzed embroideries are separated in such a manner that the aetzed embroideries have a thermoplastic backing material adhered thereto; and the excess portion of the thermoplastic backing material remains on the transfer strip.

In a preferred embodiment, the articles of aetzed embroidery are prepared with an adhesive coating on one side thereof and the articles are mounted by the adhesive coatings on a carrier strip for storage thereon and ready removal therefrom. The above-described method is modified to juxtapose a carrier strip having a layer of thermoplastic adhesive on one side thereof with the transfer strip and the embroidery composites are disposed therebetween. Upon application of heat and pressure, the thermoplastic adhesive and the thermoplastic backing material are fused so that the backing material and adhesive covered by the embroideries adheres to the embroideries, and the excess portions not covered by the embroideries adhere to the first side of the transfer strip.

15 Claims, 5 Drawing Figures

10
12
14
16
16a
16b
18
20
22
24
26
28
30
32
34
36
38
40
42
44
46
48
50
52
54
56
58
59
60
62
63
64
66
68
70
70a
71
72
74
76
78
80
82

METHOD OF STITCHING AND BONDING EMBROIDERIES ONTO THERMOPLASTIC BACKING SHEETS

FIELD OF THE INVENTION

This invention relates to a method of preparing articles of aetzed embroidery by fusing a backing of thermoplastic material thereto and removing the excess backing by bringing it in contact with a transfer strip. In a preferred embodiment, the articles of aetzed embroidery are formed with an adhesive coating on the backs thereof and the articles are mounted by the adhesive coatings on a carrier strip for storage thereon and ready removal therefrom.

The term "aetzed" as used herein is an abbreviaton of the German word "aetzstickerei" and which is defined in the Fairchild's Dictionary of Textiles as a burned embroidery wherein the pattern is embroidered in vegetable fiber on an animal fiber foundation, or vice versa, in such a manner that it will hang together like lace after the foundation is destroyed with chemicals which do not affect the embroidering yarn.

BACKGROUND OF THE INVENTION

Present methods of producing aetzed embroideries are well known and may be categorized into three different types of methods. For example, in one well-known method, the embroidery is stitched onto a silk cloth or backing which is completely disintegrated with caustic soda and boiling water. This method is inconvenient and uneconomical as a bleachery facility is required. In addition, the shaped of the embroideries are distorted because of shrinkage and colors are apt to run due to the extreme temperatures involved in the process. Further, such embroideries require extra underlay stitches which further adds to the cost of the method. Another common method is to stitch the embroidery on a polyvinyl alcohol cloth backing which is dissolved in boiling water. However, this method has all of the disadvantages of the first method described above and, in addition, has inferior stitching quality due to the backing of polyvinyl alcohol cloth. A third method involves stitching an embroidery onto a heat degradable cloth having a rayon base, such as KTM cloth. In this method, the cloth backing is disintegrated with direct or RF heat depending on the type of bonding yarn used in the cloth backing. However, this method requires the use of a monofilament fusable yarn which requires front-to-back embroidery stitching which increases production costs. In addition, the embroideries cannot be given a desirable three-dimensional appearance. Further, RF heat applying equipment is costly and the disintegrated cloth backing leaves a residue. Accordingly, although the above-described methods teach the preparation of aetzed embroideries by the destruction or disintegration of the backing material, none of these methods teach the use of backing materials which permit the simple fusing and removal of any excess backing material. Moreover, none of these methods involve the simultaneous application of an adhesive backing to the embroidery. U.S. Pat. No. 3,580,774 to Clarke and British Patent No. 1,202,357 to Evans are, however, of interest, with respect to the application of an adhesive to an article.

It is an overall object of the present invention to provide an improved method of preparing articles of aetzed embroidery by stitching the embroideries onto a backing of thermoplastic material and then fusing the thermoplastic backing material thereto and removing any excess by bringing it in contact with a transfer strip. It is a more specific object of the present invention to provide an improved method of preparing articles of aetzed embroidery having an adhesive coating on the backs thereof and mounting the articles by the adhesive coatings on a carrier strip for storage thereon and ready removal therefrom. It is a still more specific object of the present invention to provide an inexpensive and simple method to prepare aetzed embroideries and to provide an improved resultant product.

SUMMARY OF THE INVENTION

According to the present invention, there is provided a method of preparing articles of aetzed embroidery by stitching the embroideries onto a backing of thermoplastic material to form a composite. The only requirements of the thermoplastic backing material is that it must be strong enough to hold and support the embroidered stitches and the thermoplastic backing must be of the type that will fuse at a temperature range of 300° to 450° F. The embroideries may be formed on the backing material in any suitable manner and, preferably, may be formed by the use of cover stitches as the method of the present invention eliminates the need of the more costly underlay and interlock type stitches. The embroideries may be formed on a continuous web of backing material with the embroideries being spaced apart on the continuous web, or if desired, the embroideries may be stitched onto individual backing sheets and may be fed to a suitable machine by an automatic dispensing device. The composite of the embroidery and thermoplastic backing material is fed into juxtaposition with a transfer strip having a first side thereof to which the thermoplastic backing material will readily adhere. The composite and the transfer strip are pressed together and heat is simultaneously applied to bring the thermoplastic backing material to its fusing temperature for a time sufficient for the backing material covered by the embroideries to adhere to the embroideries and for the excess portions of the backing material around the embroideries and not covered thereby to fuse and to adhere to the first side of the transfer strip. Thereafter, the transfer strip and the aetzed embroideries are separated in a manner such that the aetzed embroideries have a thermoplastic backing material adhered thereto and the excess portion of the backing material remains on the transfer strip. As a result of this process, the thermoplastic backing material under the embroideries is actually absorbed or melted into the embroideries and serves to improve the bonding of the embroidery stitches and to give the embroidery more body. In this manner, the increased bonding provided to the embroideries by the fused thermoplastic backing material eliminates the need for the additional bonding typically provided by the more costly type of underlay and interlock stitches.

In a preferred embodiment, the articles of aetzed embroidery are prepared with an adhesive coating on the backs thereof and the articles are mounted by the adhesive coatings on a carrier strip for storage thereon and ready removal therefrom. A particular feature of the method resides in the step of simultaneously applying an adhesive coating to the backs of each embroidery, lightly attaching the embroideries by the adhesive coatings to a carrier strip, and removing the excess adhesive surrounding the embroideries. In this method, the composites of the embroideries on the thermoplastic backing material are disposed between a juxtaposed carrrier strip and transfer strip. The carrier strip has a layer of thermoplastic adhesive on a first side thereof and the transfer strip has a first side thereof to which the thermoplastic adhesive and the thermoplastic backing material of the composite will more readily adhere than to the first side of the carrier strip. The composites are disposed between the juxtaposed strips with the first side of the transfer strip to which the thermoplastic adhesive and the thermoplastic backing material are to be applied facing the layer of thermoplastic adhesive and the embroideries. In addition, the adhesive-receiving surfaces of the embroideries are ones to which the thermoplastic adhesive and the thermoplastic backing material will more readily adhere than to the first side of the carrier strip. The carrier and transfer strips are pressed together with the composites disposed therebetween and heat is simultaneously applied to the thermoplastic adhesive and the thermoplastic backing material to bring them to their fusing temperatures for a time sufficient for the backing material and the adhesive covered by the embroideries to adhere to the embroideries and for the excess portions of the backing material and the adhesive surrounding the embroideries and not covered thereby to fuse and to adhere to the first side of the transfer strip. Thereafter, the strips are separated in such a manner that the aetzed embroideries have a thermoplastic backing material adhered thereto and also have adhesive coatings with the aetzed embroideries being lightly adhered by their adhesive coatings to the first side of the carrier strip for storage thereon and ready separation therefrom and the excess portions of the backing material and the adhesive remain on the transfer strip.

A still further feature of the method of the present invention resides in the step of aiding the transfer of the adhesive from the carrier strip and the backing material from the embroidery to the strip of transfer material by blowing hot gases against and/or adjacent the juncture of the carrier and transfer strips formed upon separation of the strips immediately after the simultaneous application of the heat and pressure to the strips. The hot gases, preferably air, aid in transferring any excess adhesive and backing material to the strip of transfer material.

The above-described methods have a number of advantages. First, they are efficient and inexpensive to carry out and require little skill or knowledge in order to be performed. In addition, as pointed out above, the fused backing material, and in the preferred embodiment, the fused adhesive, eliminate the need for the more costly underlay and interlock type stitches. Moreover, in the preferred embodiment, the embroidery may be aetzed and the adhesive coating applied thereto in a simultaneous operation which also greatly reduces costs. Finally, the method of the present invention provides an improved product wherein the embroidery having the thermoplastic backing material fused thereto serves to improve the bonding of the embroidery stitches and thereby eliminates the need for underlay and interlock type stitches.

DESCRIPTION OF THE PREFERRED EMBODIMENT

Figures 1, 2, 3, 4, 5:
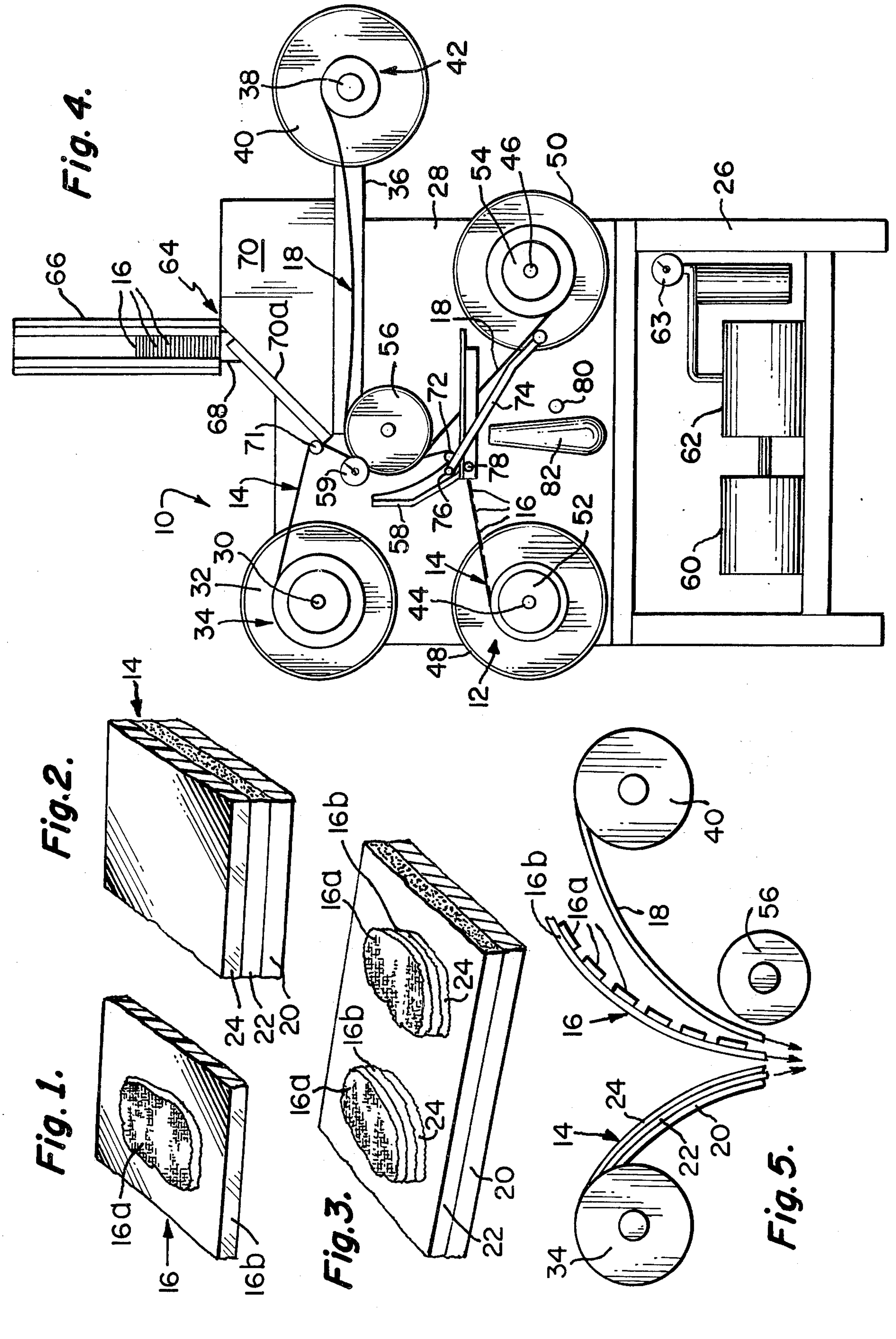
FIG. 1 is a perspective view of the embroidery to be aetzed formed on a thermoplastic backing material to form a composite which may be part of a continuous web or which may be formed into individual composites.
FIG. 2 is a perspective view of a portion of a continuous web or strip of release material before the composite of the embroidery and thermoplastic backing material are mounted thereon.
FIG. 3 is a perspective view of a portion of the strip of release material after the aetzed embroidery has been adhesively mounted thereon.
FIG. 4 is a schematic front elevational view of a machine for fusing the thermoplastic backing material to the embroideries and the excess portions surrounding the embroideries to a transfer strip, and which is also suitable for applying adhesive coatings to the backs of the embroideries and for mounting the adhesively-backed embroideries on a roll of material having a release coating thereon.
FIG. 5 is an enlarged diagrammatic view illustrating the relationship of the transfer and carrier strips and the continuous web of composites just before they come together.

Referring now to the drawings in which like reference numerals refer to similar parts throughout, there is shown in FIG. 4 a machine 10 for carrying out the method and producing the product of the present invention. Although the present invention is capable of wide application in the field of applying backings of a heat degradable or thermoplastic material to a plurality of articles, for the purpose of providing a clear understanding of the present invention, it will now be described with reference to the illustrated machine 10 which operates to adhere thermoplastic backings to a plurality of embroidered articles to form aetzed embroideries. In a preferred embodiment, the aetzed embroideries may be removably mounted by adhesive coatings on a roll of release material, and this preferred embodiment will be described first.

Machine 10 is adapted to produce a final product of a roll 12 of a strip 14 of release material having aetzed embroideries 16 removably adhered thereto. The materials required for producing roll 12 include the strip 14 of release material, a strip 18 of transfer material, and the embroidered articles 16 to be aetzed. Of course, as will be explained below with respect to an alternative embodiment, if the aetzed embroideries 16 are not produced on a roll of release material, after the embroideries are aetzed they may be individually fed to any suitable container and the strip 14 of release material would not be employed.

Referring to FIG. 1, there is shown the embroidered article 16 to be aetzed before it is delivered to machine 10 which includes an embroidered pattern **16*a* stitched onto a backing layer 16*b* formed of a suitable heat degradable material or thermoplastic material. The thermoplastic backing material 16*b* must meet two criteria: first, it must be strong enough to hold and support the stitches embroidered thereon, and, second, it must be a thermoplastic material that will fuse at a temperature in the range of 300° to 450° F. An example of a thermoplastic material having such properties and which has been employed in the present invention are polyamides. The embroidered pattern 16*a*** may be formed by any suitable manner known in the art; such as on a Schiffli machine, or it may even be hand loomed. In the preferred embodiment, only cover stitches are employed since, as will be explained below, the present invention eliminates the need for underlay or interlock type stitches to hold the embroidery together and give it sufficient body.

In FIG. 2, there is shown a portion of the strip 14 of release material as it is delivered to machine 10 which includes a base layer 20 made of aluminum, a coating of release material 22, and a layer of a thermoplastic adhesive 24 disposed on release coating 22. In FIG. 4, there is shown a portion of the strip 14 of release material as it is rolled onto the roll 52 to form the roll 12. It will be appreciated from an examination of the strip 14 in FIG. 4 that the excess portion of thermoplastic adhesive 24 and the excess portion of thermoplastic backing material **16*b* which were disposed around the embroidered article 16 to be aetzed have been removed, and the portions of thermoplastic adhesive 24 and thermoplastic backing material 16*b* covered by the embroidered articles 16 have been firmly adhered thereto serving to improve the bonding of the stitches of the embroidery and to form adhesive backings for the embroidered articles 16. Release papers and release coatings and the like are quite well known and for the purposes of the present invention it is sufficient to note that any suitable release material or coating as well as any suitable thermoplastic adhesive can be used in producing the product 12. However, the thermoplastic adhesive should be of the type that fuses in the temperature range of 300° to 450° F. so as to be compatible with thermoplastic backing material 16*b*** so that both the adhesive and the backing material will fuse at approximately the same temperatures. The best release material or coating, the best thermoplastic adhesive and the best thermoplastic backing material for a particular embroidered article can be determined by trial and error.

Referring again to FIG. 4, machine 10 generally comprises a supporting frame 26 upon which is rigidly mounted a support plate 28. A journal 30 and flat circular plate 32 on support plate 28 rotatably support a roll 34 of release material 14. A bracket 36 is rigidly attached to support plate 28 (by means not shown) and supports a journal 38 and flat circular plate 40 which, in turn, rotatably supports a roll 42 of transfer material 18. The transfer material 18 is a material to which the thermoplastic backing material **16*b* and the thermoplastic adhesive 24 will more readily adhere when brought to their fusing or softening temperature than to the release coating 22 of strip 14. In the illustrated embodiment, the transfer material 18** comprises a roll of kraft paper.

Back plate 28 further supports journals 44 and 46 and flat circular plates 48 and 50, respectively, which, respectively, support roll 52 for taking up of strip 14 and roll 54 for taking up of strip 18. The flat circular plates 32, 40, 48, and 50 present substantially frictionless surfaces against which the rolls 34, 42, 52, and 54 and the strips 14 and 18 can easily move. Support plate 28 further rotatably supports a roller 56 and pivotally supports a heated shoe member 58 having a surface thereof adapted to at least partially mate with roller 56.

A suitable electric motor 60 and gearing system (not shown) is provided for driving the journals 44, 46 at a substantially equal rate. A suction pump 62 is adapted to be driven by electric motor 60 and is used to operate an automatic article dispensing device 64 which includes an article stacker 66, a suction device 68, and an inclined plane member 70 having an inclined ramp **70*a*. Inclined ramp 70*a* is positioned so as to deposit the articles 16 on the top surface of strip 18 just prior to the strips 14, 18** coming together.

The automatic article dispensing device 64 is well known and will not be described in detail, especially since it may take other forms than the one illustrated and, in fact, can be obviated by the manual feeding of article 16, if desired, or by the feeding of embroideries stitched onto a continuous web in a spaced-apart manner, if desired. The continuous web having embroideries stitched thereon would be fed between strips 14, 18 just prior to their coming together. An additional take-up roll for the continuous web of embroideries would not be necessary, as the thermoplastic backing material forming the web would be adhered to the transfer strip 18 and the embroidered patterns **16*a* would be adhered to the strip 14** of release material.

A temperature gauge 59 is disposed adjacent to roller 56 and indicates the temperature applied to the thermoplastic backing material **16*b* and the thermoplastic adhesive 24 when the heated shoe member 58 engages roller 56. A vacuum gauge 63 is disposed adjacent suction pump 62. The details of the electric circuit of machine 10**, drive means, and article feeding and coordinating means also will not be described since they are well known, may take many forms, and would not add to a full understanding of the method and articles produced by the present invention.

As may be seen most clearly in FIG. 4, guide bearings or pins 71, 72 serve to guide strip 14 from roll 34, between heated shoe member 58 and cooperating roller 56, to take-up roll 52. Heated shoe member 58 is shown in its inoperative position in FIG. 4 in which it is spaced apart from cooperating roller 56. However, it will be appreciated that strip 14 is held against roller 56, or at least away from heated shoe member 58, when heated shoe member 58 is in its inoperative position. This is to prevent damage to strip 14 while it is not moving and which may be caused by the heat of heated shoe member 58. Similarly, strip 18 is held against roller 56, when heated shoe member 58 is in its inoperative position so as to prevent damage to strip 18 when it is not moving and which may be caused by the heat of heated shoe member 58.

One end of an operating lever 74 is rigidly connected to the bottom portion of heated shoe member 58 by a pin 76. Heated shoe member 58 is itself pivotally mounted by a pin 78 on back-up plate 28. When lever 74 is moved in a clockwise direction, an electrical circuit (not shown) is switched on causing journals 44, 46 to be driven, heat to be supplied to heated shoe member 58, automatic dispensing device 64 to operate, and a hot air blower (not shown) to operate. The hot air blower feeds hot air to a hot air nozzle 82 disposed between journals 44, 46 on support plate 28. A stop 80 is positioned to hold lever 74 in its operative position against cooperating roller 56 so that a desired mechanical pressure is applied by heated shoe member 58 against roller 56.

During operation of machine 10, the juxtaposed strips 14, 18 and the embroidered articles 16 to be aetzed and adhesively coated are pressed together by heated shoe member 58 and cooperating roller 56 to form a temporary laminate of the strips and embroidered articles. The rate of movement of the strips through the heated shoe member 58 and cooperating roller 56 and the temperature and pressure applied during their movement therethrough are selected so that the thermoplastic backing material 16*b* and the thermoplastic adhesive 24 are brought to their fusing or softening temperatures so that the portions thereof beneath embroideries 16*a* adhere to the embroideries 16*a* while the excess portions of thermoplastic backing material 16*b* and adhesive 24 surrounding the embroideries 16*a* adhere to the transfer strip 18. In practice, adhesive 24 and backing material 16*b* fuse or soften simultaneously to form a single layer or coating under each embroidery 16*a* with both the adhesive 24 and the backing material 16*b* actually being absorbed or melted into embroideries 16*a* and serve to bond the stitches thereof and to give the embroideries more body so to eliminate the need for underlay and interlock type stitches. Of course, the portions of thermoplastic adhesive 24 beneath embroideries 16*a* adhere thereto to form the desired adhesive coating or backing.

If the temporary laminate were to be retained for too long a time between heated shoe member 58 and roller 56 at an elevated temperature, it would tend to become too liquid and/or evaporate. Accordingly, the timing of the step of applying the simultaneous heat and pressure depend upon the types of material employed and can be determined by trial and error for different materials. However, it has been found that when employing a polybutylene thermoplastic adhesive 24 and a polyamide backing material 16*b*, a temperature of between 300° and 450° F. is suitable when the total time of passage of each embroidery 16*a* through the heat and pressure applying means is approximately 2 seconds. In fact, as many as 2,500 embroidered articles per hour have been aetzed and adhesively attached to a carrier strip utilizing the method of the present invention.

Hot air nozzle 82 directs a stream of hot air toward the juncture formed between strips 14, 18 as they leave cooperating roller 56 and heated shoe member 58. The hot air aids in completing the transfer of the excess thermoplastic backing material 16*b* and the thermoplastic adhesive 24 from the article 16 and the strip 14, respectively, to the transfer strip 18 and also aids in completing the light attachment of the now adhesively backed aetzed embroideries 16 to strip 14.

Guide bearing 72 may be moved to any one of a number of operating positions to vary the angle of separation of strips 14, 18 as they leave cooperating roller 56 and heated shoe member 58. Depending on the stiffness of the embroideries or other articles which are backed and the other materials employed, different angles of separation of the strips will be found to be more acceptable and more efficient in insuring that the embroideries, etc., are retained on strip 14 while the excess backing material 16*b* and adhesive 24 is transferred to strip 18.

The method of the present invention may form part of an overall system designed to permit the backing or aetzing of small or large quantities of labels, emblems, appliques, textile products, tapes, ribbons, etc., and placing them on rolls of release paper for easy dispenser application.

The method of the present invention of preparing articles of aetzed embroidery having an adhesive coating on the first surfaces thereof and mounting the articles by the adhesive coatings on a carrier strip for storage thereon and ready removal therefrom will now be described in connection with the operation of machine 10. The method generally comprises the steps of forming embroideries 16*a* on a thermoplastic backing material 16*b* to form composites 16, juxtaposing the carrier strip 14 having a layer of thermoplastic adhesive 24 on a first side thereof and the transfer strip 18 having a first side thereof to which thermoplastic adhesive 24 and thermoplastic backing material 16*b* will more readily adhere than to the first side of the carrier strip 14 with the first sides facing each other. The composites 16 are disposed between the juxtaposed strips 14, 18 with the adhesive-receiving surface of transfer strip 18 to which excess adhesive 24 and excess backing material 16*b* are to be applied facing the layer of thermoplastic adhesive 24 and embroideries 16*a*. The adhesive-receiving surfaces of embroideries 16*a* are ones to which thermoplastic adhesive 24 and thermoplastic backing material 16*b* will more firmly adhere than to the first side of carrier strip 14. Strips 14, 18 are pressed together with the composites 16 disposed therebetween to form a temporary laminate. The pressing together is effected by heated shoe member 58 and cooperating roller 56 which also apply heat to thermoplastic adhesive 24 and thermoplastic backing material 16*b* while the pressure is being applied to bring adhesive 24 and backing material 16*b* to their fusing temperatures for a time sufficient for the backing material 16*b* and adhesive 24 under embroideries 16*a* to adhere thereto and for the excess portions of adhesive 24 and backing material 16*b* not covered by embroideries 16*a* to adhere to transfer strip 18. Thereafter, strips 14, 18 are separated in a manner such that the body of the aetzed embroideries is improved by backing material 16*b* adhered thereto an the aetzed embroideries have adhesive coatings thereon and are lightly adhered by their adhesive coatings to carrier strip 14 for storage in roll form. Transfer strip 18 takes the excess portion of backing material 16*b* and adhesive 24 away from carrier strip 14 during the separating step.

The principal feature of the aforedescribed method of the present invention comprises the simultaneous step of aetzing embroideries 16*a* and applying an adhesive coating to the backs thereof, lightly adhering the aetzed embroideries by means of the adhesive coating to a carrier strip, and simultaneously removing the excess adhesive and excess thermoplastic backing material surrounding the embroideries.

The aluminum base 20 of strip 14 is made out of aluminum foil. The use of a release material including a metal base or layer is particularly advantageous. Such materials can withstand the heat generated during heating of the thermoplastic adhesive 24 and thermoplastic backing material 16*b* and, equally as important, efficiently transfer the heat generated by heated shoe member 58 to the release coating 22 and thermoplastic adhesive 24.

ALTERNATIVE EMBODIMENT

As briefly mentioned above, if the aetzed embroideries are not produced on a roll 12, they may be individually fed to any suitable container after being aetzed by heated shoe member 58 and cooperating roller 56. Accordingly, in the alternative embodiment, the strip 14 of release material would not be employed and would merely be deleted from the preferred embodiment described above. Instead of the final product being produced on a continuous roll 12 of a strip 14 of release material having the aetzed embroideries removably adhered thereto, the aetzed embroideries would be fed individually to a suitable receptacle after being aetzed. In addition, as described above, the embroideries may be fed on a continuous web, if desired, or by an automatic article dispensing device 64. The method of the present invention would then be performed substantially as described above with only thermoplastic backing material 16*b* being brought to its fusing temperature so that the portions thereof beneath embroideries 16*a* adhere thereto while the excess portions of thermoplastic backing material 16*b* surrounding the embroideries 16*a* adhere to the transfer strip 18. In this manner, the fused backing material 16*b* is actually absorbed or melted into the embroideries 16*a* and serves to bond the stitches thereof and to give the embroideries 16*a* more body, thereby eliminating the need for underlay and interlock type stitches. It has been found that when employing a polyamide backing material 16*b*, a temperature of between 300° and 450° F. is suitable when the total time of passage of each embroidery 16*a* through the heat and pressure applying means is approximately 2 seconds. In fact, as many as 2,500 aetzed embroideries per hour have been aetzed utilizing the method of the present invention.

The method of the present invention of preparing articles of aetzed embroidery will be described in connection with the operation of machine 10, which is modified by the deletion of roll 34 of release material 14. The method generally comprises the steps of forming embroideries 16*a* on a backing 16*b* of thermoplastic material to form composites 16, and feeding the composites into juxtaposition with a transfer strip 18 having the first side thereof to which the thermoplastic backing material 16*b* will readily adhere with the first side of the transfer strip 18 facing the embroideries 16*a*. The composites 16 and the transfer strip 18 are pressed together to form a temporary laminate. The pressing together is effected by heated shoe member 58 and cooperating roller 56 which also applies heat to the thermoplastic backing material 16*b* while the pressure is being applied to bring the backing material 16*b* to its fusing temperature for a time sufficient for the backing material 16*b* covered by embroideries 16*a* to adhere thereto and for the excess portion thereof not covered by embroideries 16*a* to fuse and to adhere to the first side of transfer strip 18. Thereafter, the transfer strip 18 and aetzed embroideries 16 are separated in a manner such that the aetzed embroideries have a thermoplastic backing material adhered thereto. The excess portion of thermoplastic backing material 16*b* remains on transfer strip 18.

The principal feature of the above-described method of the present invention comprises the step of aetzing an embroidery by fusing the backing material on which it is formed so that it will adhere to the embroidery and simultaneously removing the excess portions of the backing material not covered by the embroidery.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. A method of preparing articles of aetzed embroidery having an adhesive coating on first surfaces thereof and mounting said articles by said adhesive coatings on a carrier strip for storage thereon and ready removal therefrom, comprising the steps of forming embroideries on a thermoplastic backing material to form composites, juxtaposing a carrier strip having a layer of thermoplastic adhesive on a first side thereof and a transfer strip having a first side thereof to which said thermoplastic adhesive and said thermoplastic backing material will more readily adhere than to said first side of said carrier strip with said first sides facing each other, disposing said composites between said juxtaposed strips with the first side of said transfer strip to which said adhesive and said backing material are to be applied facing said layer of thermoplastic adhesive and said embroideries, said adhesive-receiving surfaces of said embroideries being ones to which said thermoplastic adhesive and said thermoplastic backing material will more firmly adhere than to said first side of said carrier strip, pressing the strips together with said composites therebetween to form a temporary laminate of said strips and said composites and simultaneously applying heat to said thermoplastic adhesive and said thermoplastic backing material while said pressure is being applied to bring the thermoplastic adhesive and the thermoplastic backing material to their fusing temperatures so that the backing material and the adhesive covered by said embroideries adheres to said embroideries and so that the excess portions of said backing material and said adhesive not covered by said embroideries fuse and adhere to the first side of said transfer strip, and then separating the strips in a manner such that the aetzed embroideries have a thermoplastic backing material adhered thereto and said aetzed embroideries have adhesive coatings and are lightly adhered by their adhesive coatings to the first side of said carrier strip for storage thereon and ready separation therefrom, and said excess portions of said backing material and said adhesive remain on said transfer strip.

2. A method according to claim 1, wherein the step of simultaneously applying heat to said thermoplastic adhesive and said thermoplastic backing material while said pressure is being applied includes the step of applying dry heat thereto.

3. A method according to claim 1, wherein the step of disposing said composites between said juxtaposed strips includes the step of feeding said composites in the form of a continuous web between said juxtaposed strips, said thermoplastic backing material forming said continuous web.

4. A method according to claim 1, wherein the step of disposing said composites between said juxtaposed strips includes the step of dispensing said composites individually between said juxtaposed strips.

5. A method according to claim 1, wherein the step of forming embroideries on a thermoplastic backing material includes the step of stitching said embroideries onto a continuous web of thermoplastic backing material with said embroideries being spaced-apart on said continuous web.

6. A method according to claim 1, wherein the step of forming embroideries on a thermoplastic backing material includes the step of stitching said embroideries onto individual sheets of thermoplastic backing material.

7. A method according to claim 1, wherein the step of simultaneously applying heat to said thermoplastic adhesive and said thermoplastic backing material while said pressure is being applied includes the step of bringing said thermoplastic adhesive and said thermoplastic backing material to their fusing temperatures substantially simultaneously so that the backing material and the adhesive covered by said embroideries simultaneously adhere to said embroideries and so that the excess portions of said backing material and said adhesive not covered by said embroideries substantially simultaneously fuse and adhere to the first side of said transfer strip.

8. A method according to claim 1, further comprising the step of blowing hot gases at the point of separation of said carrier and transfer strips at a temperature and in such a manner that the transfer of said excess portions of adhesive from said carrier strip and the transfer of said excess portions of backing material from said composites to said transfer strip is aided.

9. A method according to claim 1, further comprising the step of rolling said carrier strip with the articles lightly adhered thereto onto a roll.

10. A method of preparing articles of aetzed embroidery comprising the steps of forming embroideries on a backing of thermoplastic material to form composites, feeding said composites into juxtaposition with a transfer strip having a first side thereof to which said thermoplastic backing material will readily adhere with said first side facing said embroideries, pressing said composites and said transfer strip together to form a temporary laminate of said strip and said composites and simultaneously applying heat to said thermoplastic backing material while said pressure is being applied to bring said thermoplastic backing material to its fusing temperature so that said thermoplastic backing material covered by said embroideries adheres to said embroideries and so that the excess portions thereof not covered by said embroideries fuse and adhere to the first side of said transfer strip, and then separating said transfer strip and said aetzed embroideries in a manner such that the aetzed embroideries have a thermoplastic backing material adhered thereto, and said excess portions of said thermoplastic backing material remain on said transfer strip.

11. A method according to claim 10 wherein the step of feeding said composites into juxtaposition with a transfer strip includes the step of dispensing said composites individually onto said transfer strip.

12. A method according to claim 10, wherein the step of feeding said composites into juxtaposition with a transfer strip includes the step of feeding said composites in the form of a continuous web into juxtaposition with said transfer strip, said thermoplastic backing material forming said continuous web.

13. A method according to claim 10, wherein the step of simultaneosly applying heat to said thermoplastic backing material while said pressure is being applied includes the step of applying dry heat thereto.

14. A method according to claim 10, wherein the step of forming embroideries on a thermoplastic backing material includes the step of stitching said embroideries onto a continuous web of thermoplastic backing material with said embroideries being spaced-apart on said continuous web.

15. A method according to claim 10, wherein the step of forming embroideries on a thermoplastic backing material includes the step of stitching said embroideries onto individual sheets of thermoplastic backing material.

* * * * *